March 15, 1927. 1,620,974
G. KLENK
METHOD OF MANUFACTURING TURBINES
Filed March 29, 1924    2 Sheets-Sheet 1

Inventor
G. Klenk
by
Attorney

March 15, 1927.

G. KLENK 1,620,974

METHOD OF MANUFACTURING TURBINES

Filed March 29. 1924　　2 Sheets—Sheet 2

Inventor
G. Klenk
by
Attorney

Patented Mar. 15, 1927.

1,620,974

UNITED STATES PATENT OFFICE.

GEORGE KLENK, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

METHOD OF MANUFACTURING TURBINES.

Application filed March 29, 1924. Serial No. 702,783.

This invention relates in general to improvements in the art of assembling and permanently uniting similar elements in predetermined relation to each other, and relates more specifically to an improved method of and apparatus for rigidly connecting a plurality of definitely spaced and angled turbine blades to form an integral blade segment.

An object of the invention is to provide an improved method of assembling and uniting turbine blades or the like, whereby a more efficient turbine structure is produced. Another object of the invention is to provide improvements in the process of manufacturing segments of turbine blades or similar elements, whereby the cost of production is reduced to a minimum. A further object of the invention is to provide simple and efficient apparatus for effecting commercial exploitation of the improved processes.

Prior to the present improvement, it was proposed to facilitate the manufacture of turbine blade segments by utilizing the following method. The blades were first temporarily assembled and permanently united in properly spaced and angled relation, by rigidly attaching to the corresponding ends of each group of blades, a shroud segment or other permanent holding element. These temporarily assembled segments were produced by mechanics skilled in the art of temporarily uniting the blades into segments. The temporarily united blades were then transferred to the foundry where each segment was mounted in a molding jig and the spaces between the blades packed with sand preparatory to casting a foundation segment thereon. Each molding jig with the blades assembled therein was then placed in a properly prepared mold and a foundation segment cast thereon, after which the segment was ready for final finishing and attachment to supporting structure.

This previously proposed method while possessing certain advantages over the prior method of assembling and uniting turbine blades, necessitated the use of a relatively large number of molding jigs and also necessitated delay in reuse of these molding jigs in view of the fact that they were placed bodily into the mold during the casting operation. The prior process referred to forms the subject of a copending application Serial No. 702,782 filed March 29, 1924 by Paul C. Dimberg, and the present invention is merely an improvement thereover. Some of the novel features or steps of the method herein described, form no part of the present invention and are being claimed in the above identified copending application.

The present improvement consists of eliminating the step of the prior method whereby the molding jig is inserted bodily within the mold together with the blading, during the casting operation. With the improved method only the sand packed blade segments are inserted within the mold, thereby permitting reuse of the same employed during preparation of a segment for casting, immediately after the said segment has been properly prepared, and also permitting disposition of a greater number of segments in a single mold, thus increasing the rate and decreasing the cost of production. These and other objects and advantages of the improved method will be apparent in the course of the accompanying description.

A clear conception of the various steps of the improved method and of the construction and operation of one embodiment of apparatus utilized for commercial exploitation thereof, may be had by referring to the drawings accompanying and forming a part of this specification in which like reference characters designate the same or similar parts in the various views.

Figure 1:
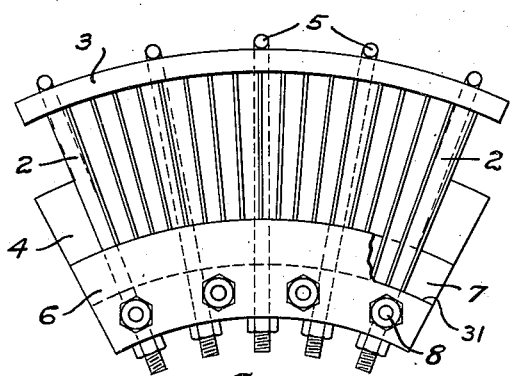
Fig. 1 is a plan view of a blade spacing and angling jig showing a plurality of blades assembled and clamped therein.
Figure 2:
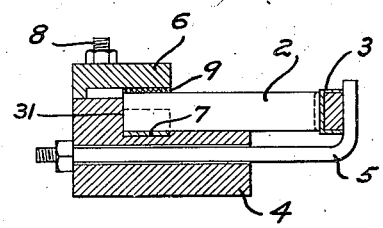
Fig. 2 is a section through the spacing and angling jig of Fig. 1, showing blades assembled and clamped therein.

In commercially exploiting the improved method of manufacturing turbine blade segments, a blade spacing and angling jig such as shown in Figs. 1 and 2 is first provided. This jig comprises a supporting plate or other support 4 having a substantially plane upper supporting surface and having an end surface 31 of proper curvature extending perpendicular to an end of the supporting surface; a top retaining plate 6 of segmental form adapted to be secured to the support 4 by means of studs 8 and nuts associated therewith and having a resilient or flexible blade holding strip 9 attached to the lower face of the over-hanging portion thereof; a segmental notched spacing and angling strip 7 secured to the support 4 below the overhanging portion of the plate 6; and a series of radially disposed clamps 5 loosely disposed in horizontal through openings in the support 4 and having outer ends which will extend substantially at right angles, the opposite ends of the clamps being screw threaded to receive the clamp adjusting nuts. The blades 2 which are adapted to be assembled in the spacing and angling jig, are ordinarily of uniform cross sectional area throughout their lengths, and are cut to equal sizes. The shroud segments 3 are ordinarily formed of channel shaped cross section and are notched to receive the adjacent blade ends at the predetermined spacing and angles.

When assembling the blades in the spacing and angling jig, the top plate 6 is first released sufficiently to permit the blades 2 to be slipped endwise into the spacing and angling notches of the strip 7. After the blades have been thus inserted within the jig, a shroud segment 3 is applied to the outer free ends of the blades 2 and is clamped in position by means of the clamps 5 as indicated in Figs. 1 and 2. With the clamps 5 properly adjusted, the foundation ends of the blades 2 are firmly held in contact with the surface 31 of the support 4. The plate 6 may then be forced into clamping position with the aid of the studs 8, causing rigid clamping of the foundation ends of the blades 2 between the flexible strip 9 and the notched retaining segment 7. While the blades 2 are thus positively held in properly spaced and angled position, the shroud strip 3 is rigidly attached to the blades by brazing, soldering or otherwise. When the shroud strip 3 has been thus permanently attached to the blade ends, the blades 2 have been rigidly united to produce a unitary segment, and may be removed from the spacing and angling jig upon release of the top plate 6 and of the clamps 5. The work of temporarily assembling the blades into segments may be done by experts in the art of assembling and uniting blade segments.

Figure 3:
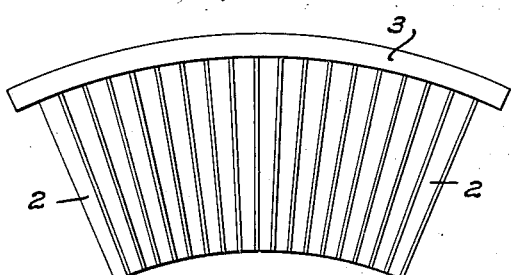
Fig. 3 is a plan view of a blade segment temporarily but rigidly assembled by attachment thereto of a shroud segment.
Figure 4:
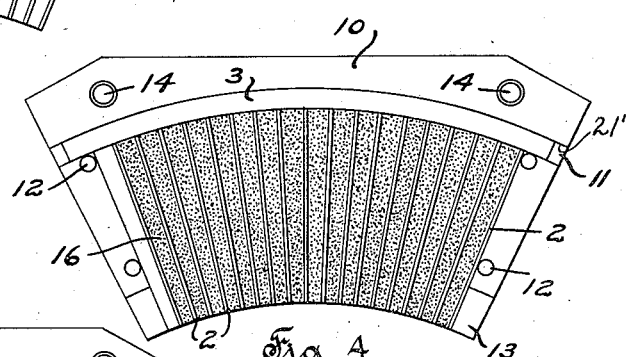
Fig. 4 is a plan view of a core box of the type employed while packing sand into the spaces between the blades, the top plate or cover having been removed.
Figure 5:
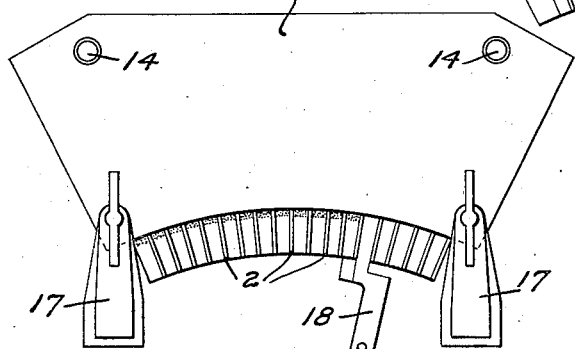
Fig. 5 is a plan view of the core box shown in Fig. 4, with the top cover applied and with the blade roots projecting freely from the core box.
Figure 6:
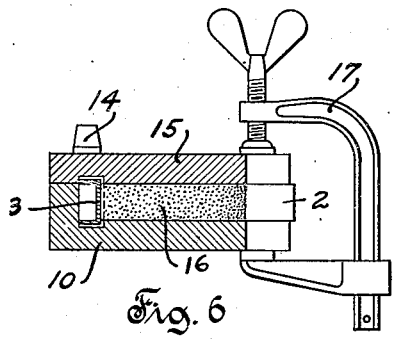
Fig. 6 is a section through the apparatus of Fig. 5 showing a blade segment therein with a part of the spaces between the blades filled with sand preparatory to application of the foundation segment.

The temporarily rigidly united blade segment consisting of the radially disposed blades 2 and shroud segment 3 as shown in Fig. 3, may then be transferred to the foundry, being ready to receive the foundation segment. In the foundry a core box such as shown in Figs. 4 to 6 inclusive is provided, the core box consisting of a lower supporting plate 10 having a segmental groove 11 therein and a properly curved perpendicular surface 21' adjacent to the groove 11; a plurality of segment retaining pins 12 associated with the support 10 as shown in Fig. 4; and a top plate 15 associable with dowel pins 14 attached to the bottom plate 10. The core box has a curved end surface which is cooperable with a segmental strip 13 to form a horizontal surface beneath an entire blade segment disposed within the core box. The temporarily united blade segment may be readily inserted within the core box upon removal of the top plate 15, as shown in Fig. 4, after which the spaces between the successive blades 2 may be completely filled and packed with sand 16. The top plate 15 may then be applied as shown in Figs. 5 and 6, being clamped to the bottom plate 10 by means of clamps 17. Upon removal of the lower segmental strip 13 a portion of the sand 16 may be removed from between the projecting blade ends and a ramming tool 18 such as shown in Fig. 5 may be utilized to obtain smooth surfaces adjacent to the foundation ends of the blades. After the root ends of the blades have been thus properly prepared for the reception of a foundation segment, the clamps 17 may be released and the top plate 15 removed, whereupon the sand packed blade segment is freely removable from within the core box.

Figure 7:
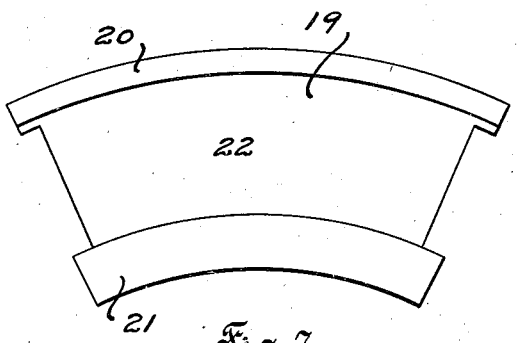
Fig. 7 is a plan view of a pattern used in preparing a mold for the reception of a sand packed blade segment.
Figure 8:
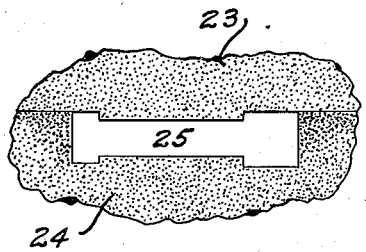
Fig. 8 is a section through a mold preparatory to receiving a sand packed blade segment.
Figure 9:
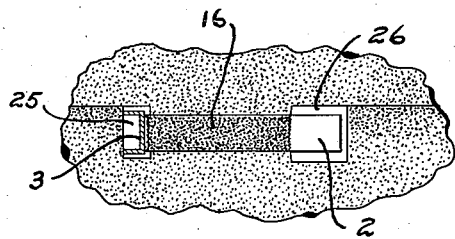
Fig. 9 is a section through the mold with a sand packed blade segment disposed therein.

A pattern 22 shown in Fig. 7 and comprising a blade section 19, a shroud section 20, and a foundation section 21 and having a shape substantially similar to that of a completed blade segment, is also provided. With the aid of such a pattern, a mold such as shown in Figs. 8 and 9 and having a space 25 formed between a cope 23 and drag 24, is next provided. The sand packed blade segment is then inserted within the mold as shown in Fig. 9, the space 26 surrounding the blade roots providing for the reception of metal during casting of the foundation segment. When the molten metal is poured into the space 26, the metal fuses with the foundation ends of the blades and rigidly unites these ends.

Figure 10:
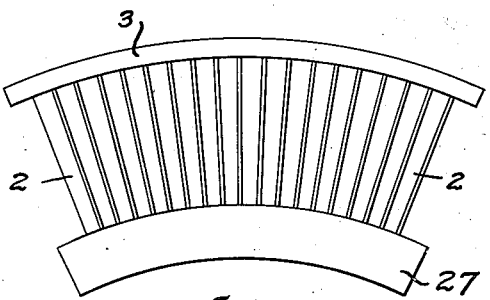
Fig. 10 is an elevation of a completed blade segment after removal thereof from the mold.
Figure 11:
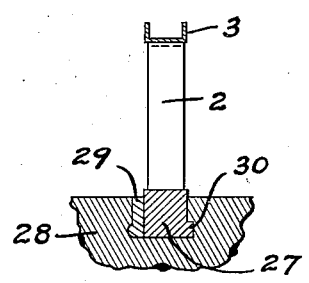
Fig. 11 is a section through a blade segment which has been completely finished and applied to adjacent supporting structure of a turbine.

The blade segment with the foundation segment 27 attached thereto by fusion of metal as shown in Fig. 10, after removal from the mold, is ready for final finishing preparatory to application thereof in a turbine. The finishing of these segments is accomplished in any convenient manner and the finished segments are provided with transverse projections 30 adapted for coaction with a recess in a supporting element 28, the assembled blade segments being held in proper position by means of calking strips 29.

It will thus be noted that with the improved process the core box used for preparing the blades for casting is ready for reuse immediately after one blade segment has been properly prepared, thereby eliminating the large number of molding jigs necessary for maximum production with the prior method. With the improved process a maximum number of segments may also be cast in a single mold thereby further enhancing the production. It will also be obvious that elements other than turbine blades may be readily assembled and united with the aid of the present improvement.

It should be understood that it is not desired to limit the invention to the exact steps of the process and to the exact details of construction and operation of the apparatus herein shown and described, for various modifications within the scope of the claims may occur to persons skilled in the art.

It is claimed and desired to secure by Letters Patent:

1. The method of manufacturing a turbine blade segment, which comprises, rigidly permanently uniting a plurality of blades at one end, partially filling the spaces between the successive end united blades with non-combustible material, placing only the end united blades with the filling therebetween in a mold, and casting a permanent foundation segment upon the opposite ends of the blades.

2. The method of manufacturing a turbine blade segment, which comprises, definitely positioning a plurality of blades, rigidly permanently uniting the corresponding ends of said blades, partially filling the spaces between the successive end united blades with non-combustible material, placing only the end united blades with the filling therebetween in a mold, and casting a permanent foundation segment upon the opposite ends of the blades.

3. The method of manufacturing a turbine blade segment, which comprises, definitely positioning a plurality of blades, permanently attaching a shroud segment to the corresponding ends of the blades, partially filling the spaces between the successive end united blades with non-combustible material, placing only the shroud segment and the blades with the filling therebetween in a mold, and casting a permanent foundation segment upon the ends of the blades remote from said shroud segment.

4. The method of manufacturing a turbine blade segment, which comprises, definitely positioning a plurality of blades, brazing a shroud segment to the corresponding ends of said blades, partially filling the spaces between the successive end united blades with non-combustible material, placing only the shroud segment and the blades with the filling therebetween in a mold, and casting a permanent foundation segment upon the ends of the blades remote from said shroud segment.

5. The method of manufacturing a turbine blade segment, which comprises, definitely temporarily positioning a plurality of independent blades, permanently brazing a shroud segment to the corresponding ends of said temporarily positioned blades, filling the spaces between successive blades with sand while permitting the opposite ends of said blades to project beyond said sand, placing only the sand packed blades into a mold, and casting a foundation segment upon the projecting ends of said blades.

In testimony whereof, the signature of the inventor is affixed hereto.

GEORGE KLENK.